United States Patent
Barrow et al.

(10) Patent No.: US 9,463,685 B2
(45) Date of Patent: Oct. 11, 2016

(54) TAILGATE LINER ASSEMBLY AND METHOD FOR VEHICLE TAILGATE

(71) Applicant: Honda Motor Co., Ltd., Tokyo (JP)

(72) Inventors: Andrew Edward Barrow, Powell, OH (US); Jason Dilley, Plain City, OH (US); Justin Longwell, Westerville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 106 days.

(21) Appl. No.: 14/277,935

(22) Filed: May 15, 2014

(65) Prior Publication Data
US 2015/0329066 A1    Nov. 19, 2015

(51) Int. Cl.
*B60R 13/02* (2006.01)
*B60J 5/10* (2006.01)
*B60R 13/01* (2006.01)

(52) U.S. Cl.
CPC .............. *B60J 5/107* (2013.01); *B60R 13/011* (2013.01); *B60R 13/0243* (2013.01); *B60R 2013/0287* (2013.01); *B60R 2013/0293* (2013.01)

(58) Field of Classification Search
CPC ........ B60J 5/0413; B60J 5/101; B60J 5/107; B60R 13/2043; B60R 2013/0293; B60R 13/01; B60R 13/011; B60R 13/02; B60R 13/0243; B60R 13/0287; B29L 2031/3014; B29L 2031/3041; B29C 44/04; B29C 44/12
See application file for complete search history.

(56) References Cited

U.S. PATENT DOCUMENTS

| 4,333,678 | A | | 6/1982 | Munoz et al. |
| 4,363,617 | A | * | 12/1982 | Hirsekorn ............. B29C 33/306 425/388 |
| 4,396,219 | A | | 8/1983 | Cline |
| 4,540,214 | A | | 9/1985 | Wagner |
| 4,913,873 | A | | 4/1990 | Robbins et al. |
| 5,074,009 | A | * | 12/1991 | Simonton ............. A47B 95/02 16/416 |
| 5,154,478 | A | | 10/1992 | Erickson et al. |
| 5,364,150 | A | | 11/1994 | Cochran et al. |

(Continued)

FOREIGN PATENT DOCUMENTS

| DE | 4026217 A1 * | 2/1992 | ............. B60J 5/0413 |
| DE | 1057671 A2 * | 12/2000 | ............. B60J 5/0405 |

(Continued)

OTHER PUBLICATIONS

Website: Ce Dur Shakes Manufacturing—Reaction Injection Molding, http://www.endur-allroofing.com/manufacturing.htm, printed May 14, 2014.

*Primary Examiner* — Glenn Dayoan
*Assistant Examiner* — Paul Chenevert
(74) *Attorney, Agent, or Firm* — Rankin, Hill & Clark LLP (57) ABSTRACT

A tailgate on a vehicle and a method of forming a tailgate for a vehicle includes a tailgate frame, a tailgate liner secured to the tailgate frame and a tailgate liner insert fixedly secured to the tailgate liner. The tailgate liner is formed of a first material and the tailgate liner insert is formed of a second material that is different from the first material. The tailgate liner insert is adapted to be accommodated within an insert aperture defined in the tailgate liner. The tailgate liner insert having an integrally molded feature.

18 Claims, 9 Drawing Sheets

(56) References Cited

U.S. PATENT DOCUMENTS

| | | | | |
|---|---|---|---|---|
| 5,419,603 | A * | 5/1995 | Kremer | B60P 7/0807 24/265 CD |
| 5,695,235 | A | 12/1997 | Martindale et al. | |
| 6,019,418 | A * | 2/2000 | Emerling | B60J 5/0416 296/146.7 |
| 6,203,090 | B1 | 3/2001 | Vitoorapakorn | |
| 6,213,540 | B1 | 4/2001 | Tusim et al. | |
| 6,431,638 | B1 * | 8/2002 | Mrozowski | B60J 5/101 296/146.1 |
| 6,547,317 | B1 * | 4/2003 | Cheron | B62D 25/084 180/68.4 |
| 7,086,680 | B2 | 8/2006 | Montagna et al. | |
| 7,504,133 | B2 | 3/2009 | Cuyler et al. | |
| 7,618,075 | B2 | 11/2009 | Boddie et al. | |
| 8,136,860 | B2 | 3/2012 | Wise et al. | |
| 2003/0173796 | A1* | 9/2003 | Harima | B60J 5/101 296/146.7 |
| 2004/0124659 | A1* | 7/2004 | Vaitus | B60J 5/101 296/106 |
| 2005/0218170 | A1* | 10/2005 | Allmond | B60R 7/046 224/542 |
| 2007/0145768 | A1* | 6/2007 | Saitoh | B60J 5/101 296/146.5 |
| 2008/0179917 | A1* | 7/2008 | Kaplanov | B60J 5/0468 296/191 |
| 2009/0188877 | A1* | 7/2009 | Stewart | F25D 25/024 211/71.01 |
| 2011/0243656 | A1* | 10/2011 | Ikekame | B29C 65/607 403/345 |
| 2012/0314438 | A1* | 12/2012 | Gutt | B60Q 3/0233 362/511 |
| 2013/0140846 | A1* | 6/2013 | Montoya | B60R 13/0243 296/146.7 |
| 2013/0234462 | A1* | 9/2013 | Coakley | B60R 9/058 296/1.08 |

FOREIGN PATENT DOCUMENTS

| | | | | |
|---|---|---|---|---|
| DE | 10118425 A1 | * | 10/2002 | B60J 5/101 |
| DE | 10225292 | * | 12/2003 | B60H 1/00271 |
| DE | 102005052767 B3 | * | 1/2007 | B29C 45/14336 |
| DE | 102013223275 A1 | * | 5/2015 | B60S 1/56 |
| EP | 1927453 | | 6/2008 | |
| ES | WO 2007085560 A2 | * | 8/2007 | B23K 20/10 |
| ES | 1842708 | * | 10/2007 | B60J 5/0416 |
| FR | 2796915 A1 | * | 2/2001 | B60J 5/10 |
| FR | 1132237 A1 | * | 9/2001 | B60J 5/10 |
| FR | 2875473 | * | 3/2006 | B60J 5/0416 |
| FR | WO 2007107668 A2 | * | 9/2007 | B06R 13/0206 |
| FR | 2931505 A3 | * | 11/2009 | B60J 5/107 |
| FR | 2937277 A1 | * | 4/2010 | B29C 44/141 |
| JP | 19803978 A1 | * | 8/1998 | B60J 5/101 |
| JP | WO 03092984 A1 | * | 11/2003 | B29C 45/0005 |
| JP | WO 2008072440 A1 | * | 6/2008 | B60N 3/02 |
| JP | WO 2008153197 A1 | * | 12/2008 | B60J 5/107 |
| JP | WO 2014199939 A1 | * | 12/2014 | B60R 13/0243 |

* cited by examiner

TAILGATE LINER ASSEMBLY AND METHOD FOR VEHICLE TAILGATE

BACKGROUND

Many vehicles include a rear closure in the form of a tailgate for accessing a cargo area within a vehicle's cabin. Typically, such a cargo area is disposed behind rear seats in the vehicle cabin (e.g., behind a second or third row of seats in the vehicle cabin). The tailgate for this cargo area conventionally includes a steel frame that is pivotally secured to the vehicle body and/or vehicle frame so as to be pivotable between a closed position and an open position. For example, the tailgate may be pivotable along an upper edge thereof so as to be movable between a closed position and a flip-open position. Often, a tailgate liner is secured to the steel frame along an inner side of the steel frame to form an interior surface of the vehicle. In addition, a tailgate skin can be secured to the steel frame on an outer surface of the tailgate to form an exterior surface of the vehicle. Thus, the tailgate liner faces inward into the vehicle cabin when the tailgate is in a closed position and the tailgate skin faces outward. One function of the tailgate liner is to improve aesthetics of the vehicle as without the tailgate liner the tailgate frame might appear unsightly.

In addition to forming an inside surface for the vehicle, some tailgate liners also cover an underside of the tailgate that may only be viewable when the tailgate is in the open position. Often, several tailgate parts, features and/or operating devices are provided along the underside of the tailgate. For example, these can include latching and/or locking mechanisms for securing the tailgate in the closed position, buttons or switches for operating powered tailgates (e.g., a close tailgate button that, when depressed, actuates automated powered closure of the tailgate), handles or other grasping assemblies, etc. On higher end vehicles, it may be desirable to present the underside of the tailgate in an aesthetically pleasing manner and therefore not overly expose the underside of the tailgate (e.g., the tailgate frame) to provide an improved appearance or look for the tailgate.

Conventional tailgate linings are often made by standard injection molding processes. Integrally molded features can typically be incorporated into the underside of the tailgate lining via complicated die assemblies in the injection molding tool (e.g., cavity slides) and/or complicated molding techniques. However, as new materials have been developed for vehicle parts that provide various enhanced structural properties (e.g., weight savings), sometimes the conventional injection molding techniques are not suitable for use with such new materials.

SUMMARY

According to one aspect, a tailgate on a vehicle includes a tailgate frame, a tailgate liner secured to the tailgate frame, and a tailgate liner insert separately formed from the tailgate liner and fixedly secured to the tailgate liner. The tailgate liner insert has an integrally molded feature.

According to another aspect, a tailgate liner assembly for a tailgate on a vehicle includes a tailgate liner defining an insert aperture and a tailgate liner insert having an integrally molded feature that is unsuitable for incorporation into the tailgate liner. The tailgate liner is received in the insert aperture defined by the tailgate liner. The tailgate liner and the tailgate liner insert are separately formed from different materials.

According to a further aspect, a method of forming a tailgate for a vehicle is provided. In the method according to this aspect, a tailgate liner is formed of a first material, wherein the tailgate liner is adapted to overlap a tailgate frame of the tailgate. The tailgate liner defines an insert aperture along a lower side thereof. Also, a tailgate liner insert is formed of a second material that is different from the first material. The tailgate liner insert is adapted to be accommodated within the insert aperture of the tailgate liner and has an integrally molded feature. After forming of the tailgate liner and the tailgate liner insert, the tailgate liner insert is secured to the tailgate liner.

DETAILED DESCRIPTION

Figure 1:
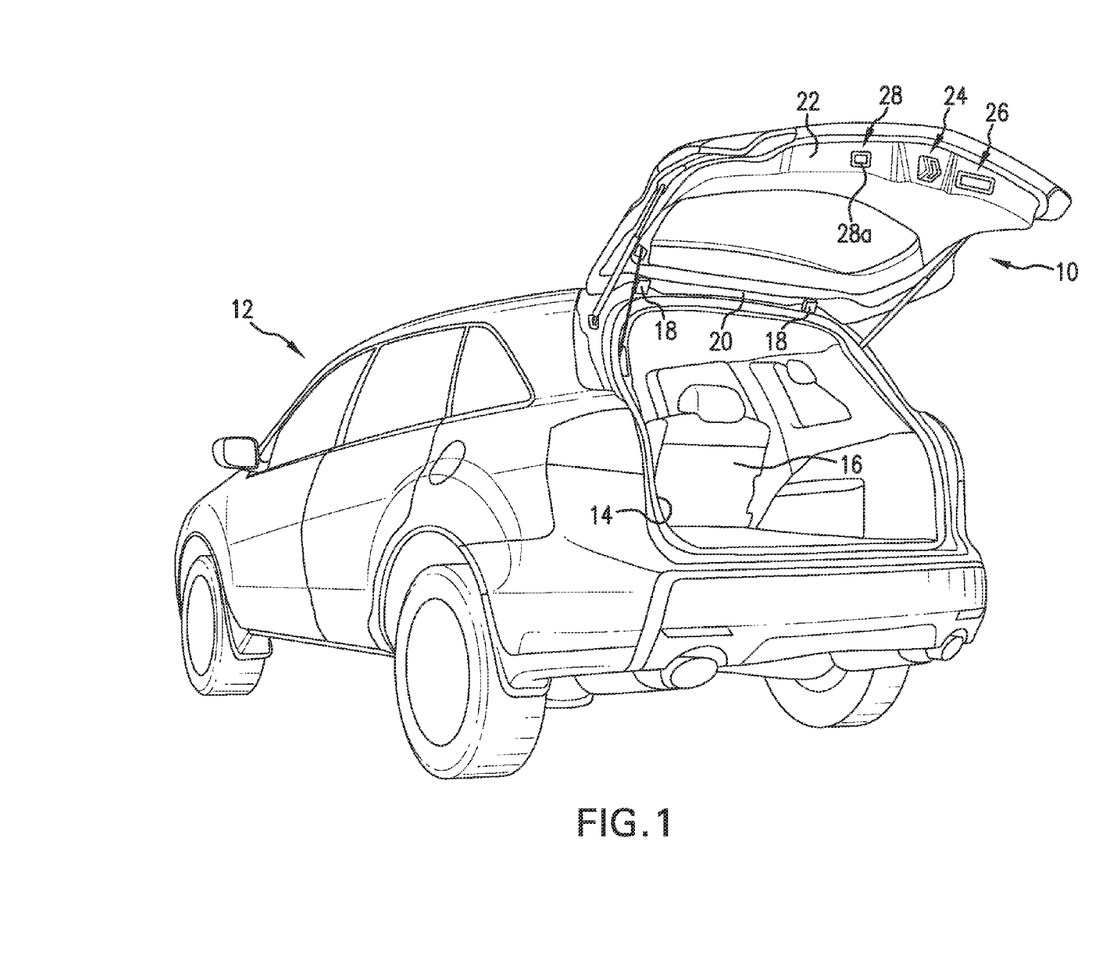
FIG. 1 is a perspective view of a vehicle having a tailgate with a tailgate liner assembly according to an exemplary embodiment.

Referring now to the drawings wherein the showings are for purposes of illustrating one or more exemplary embodiments and not for purposes of limited the same, FIG. 1 shows a tailgate 10 pivotally mounted on a vehicle 12. In the illustrated embodiment, the vehicle is shown as a sport utility vehicle (SUV) or closed-cabin vehicle wherein the tailgate 10 is provided as a closure on a rear side of the vehicle 12. The tailgate 10 is moveable between a closed position wherein the tailgate 10 closes a rear opening 14 defined on the rear side of the vehicle 12 and an open position for providing access through the rear opening 14. In the illustrated embodiment, the rear opening 14 provides access to a cargo area in the vehicle 12 that is disposed behind a rear set of seats 16 (only one shown), though other configurations could be employed. The tailgate 10 of the illustrated embodiment is pivotally mounted to the vehicle 12 via hinges 18 along an upper edge 20 of the tailgate 10 so that the tailgate 10 is moveable between the closed position and the open position wherein the open position is a flip-open position that positions the tailgate in an elevated orientation above the rear opening 14.

As shown in FIG. 1, when the tailgate 10 is in the flip-open position, an underside 22 of the tailgate, which is normally hidden from view when the tailgate 10 is in the closed position, is exposed and viewable. In the illustrated embodiment, various features, parts, tailgate operating devices, etc. can be provided on the underside 22. For example, as shown, a latch housing 24 protrudes from the underside 22 and is provided for selectively latching and/or locking the tailgate 10 when in the closed position. Also, a recessed handle or grasping feature 26 is provided on the underside 22. This can be used when manually closing or opening the tailgate 10. Also provided on the underside 22 of the tailgate 10 in the illustrated embodiment is a powered actuator feature 28. The powered actuator feature 28 can include a button 28a that, upon depression, causes powered closure of the tailgate 10 via a controller and motor (both not shown).

Figure 2A:
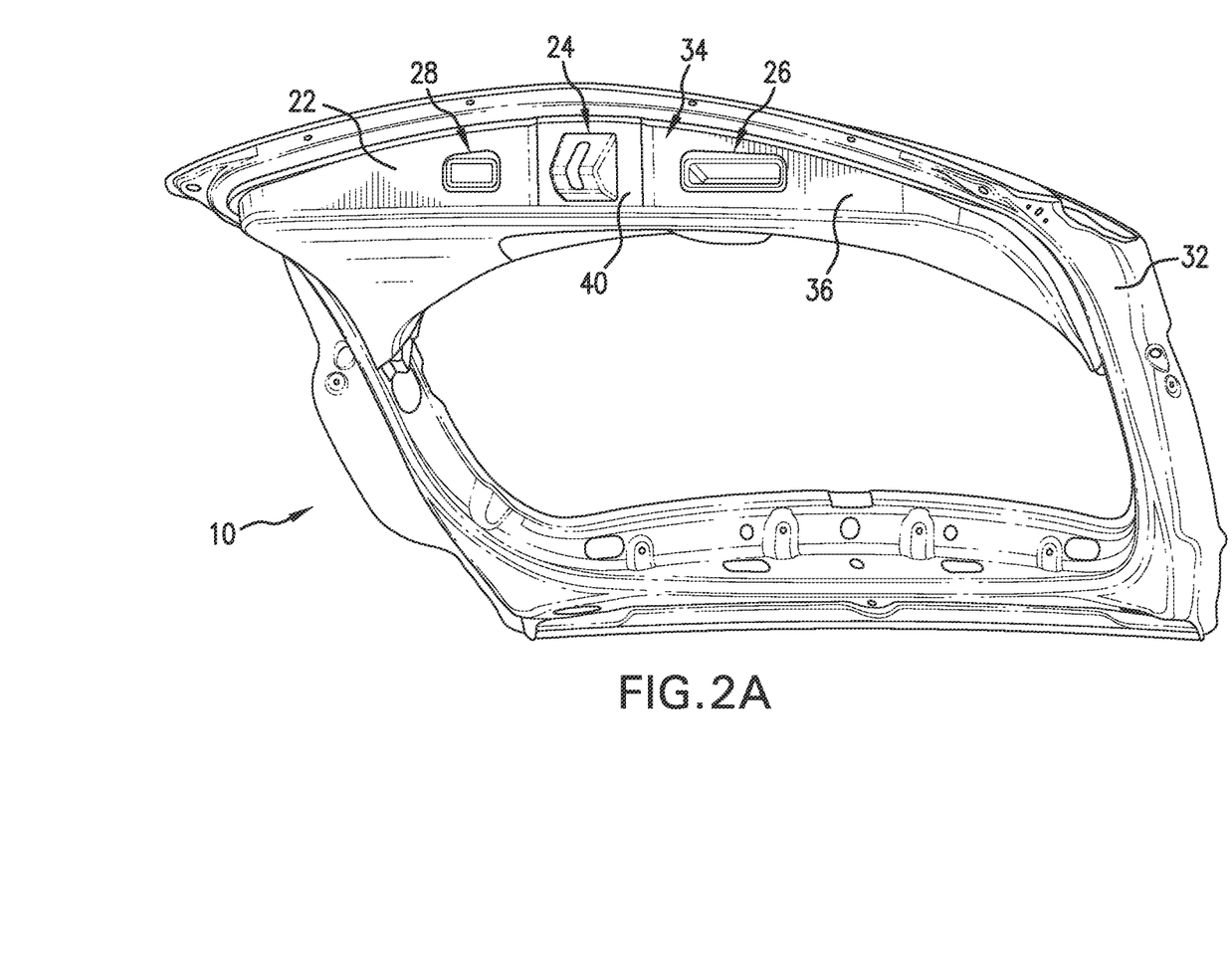
FIG. 2A is a perspective view of the tailgate shown in isolation from the vehicle
Figure 2B:
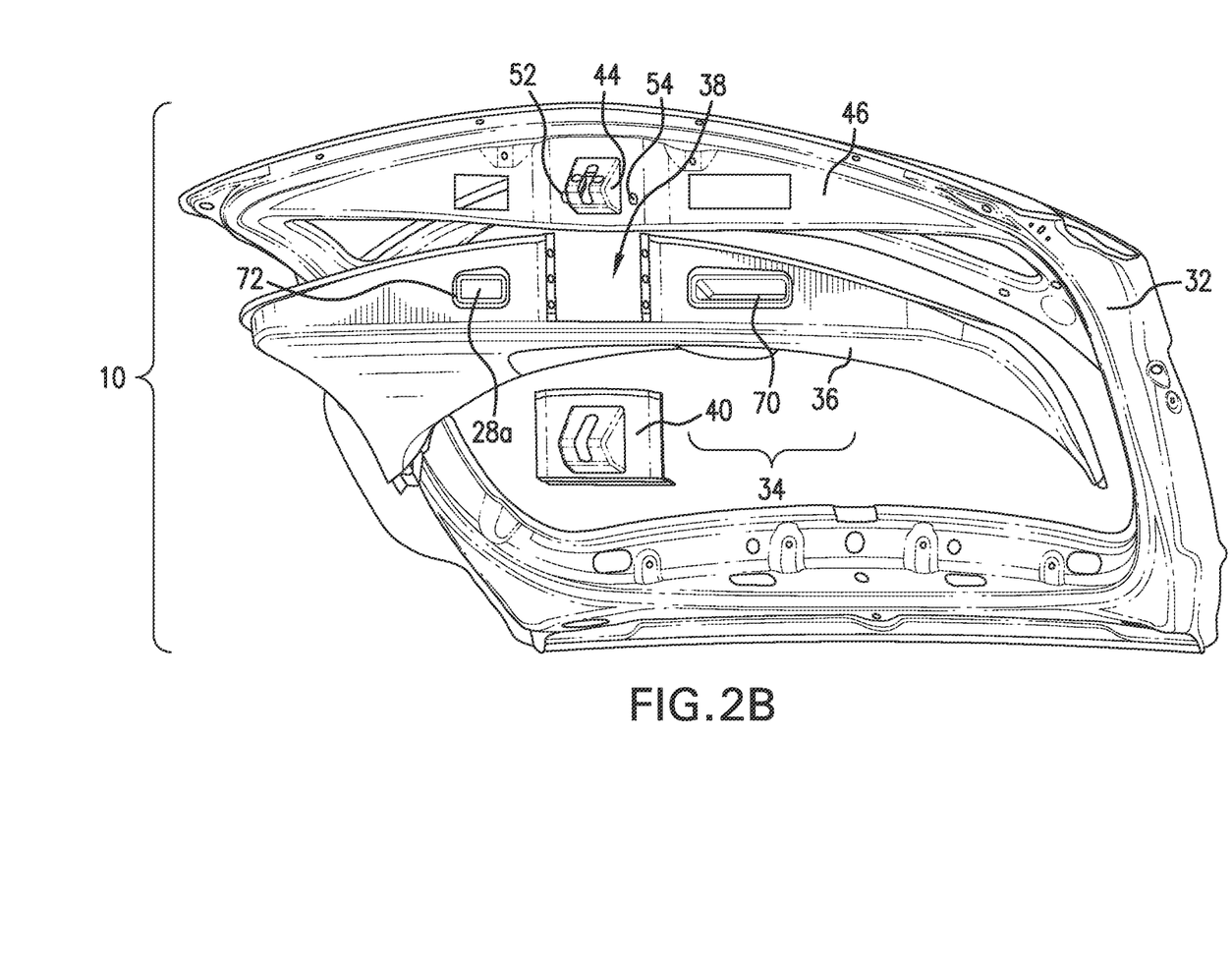
FIG. 2B is an exploded perspective view of the tailgate showing the tailgate liner assembly comprising a tailgate liner and a tailgate liner insert.

With additional reference to FIGS. 2A and 2B, the tailgate 10 includes a tailgate frame 32 and a tailgate liner assembly 34. The tailgate liner assembly 34 includes a tailgate liner 36 defining an insert recess or aperture 38 (see FIG. 2B) and a tailgate liner insert 40 that is separately formed from or relative to the tailgate liner 36. When assembled, the tailgate liner insert 40 is fixedly secured to the tailgate liner 36 and the tailgate liner 36 and the tailgate liner insert 40 are secured to the tailgate frame 32 to form the tailgate 10. As will be described in more detail below, the tailgate liner insert 40 has an integrally molded feature. In particular, the tailgate liner insert 40 has an integrally molded feature that is generally unsuitable for incorporation into the tailgate liner 36. As such, the integrally molded feature is provided on the tailgate liner insert 40 and then the tailgate liner insert 40 is received in the insert aperture 38 defined by the tailgate liner 36 and secured to the tailgate liner 36. This arrangement advantageously allows for the tailgate liner 36 and the tailgate liner insert 40 to be separately formed from different materials (e.g., the tailgate liner 36 can be formed from a first material more suitable for the tailgate liner and the tailgate liner insert 40 can be formed from a second material more suitable for the tailgate liner insert, and particularly for the integrally molded feature incorporated into the tailgate liner insert).

Figure 3:
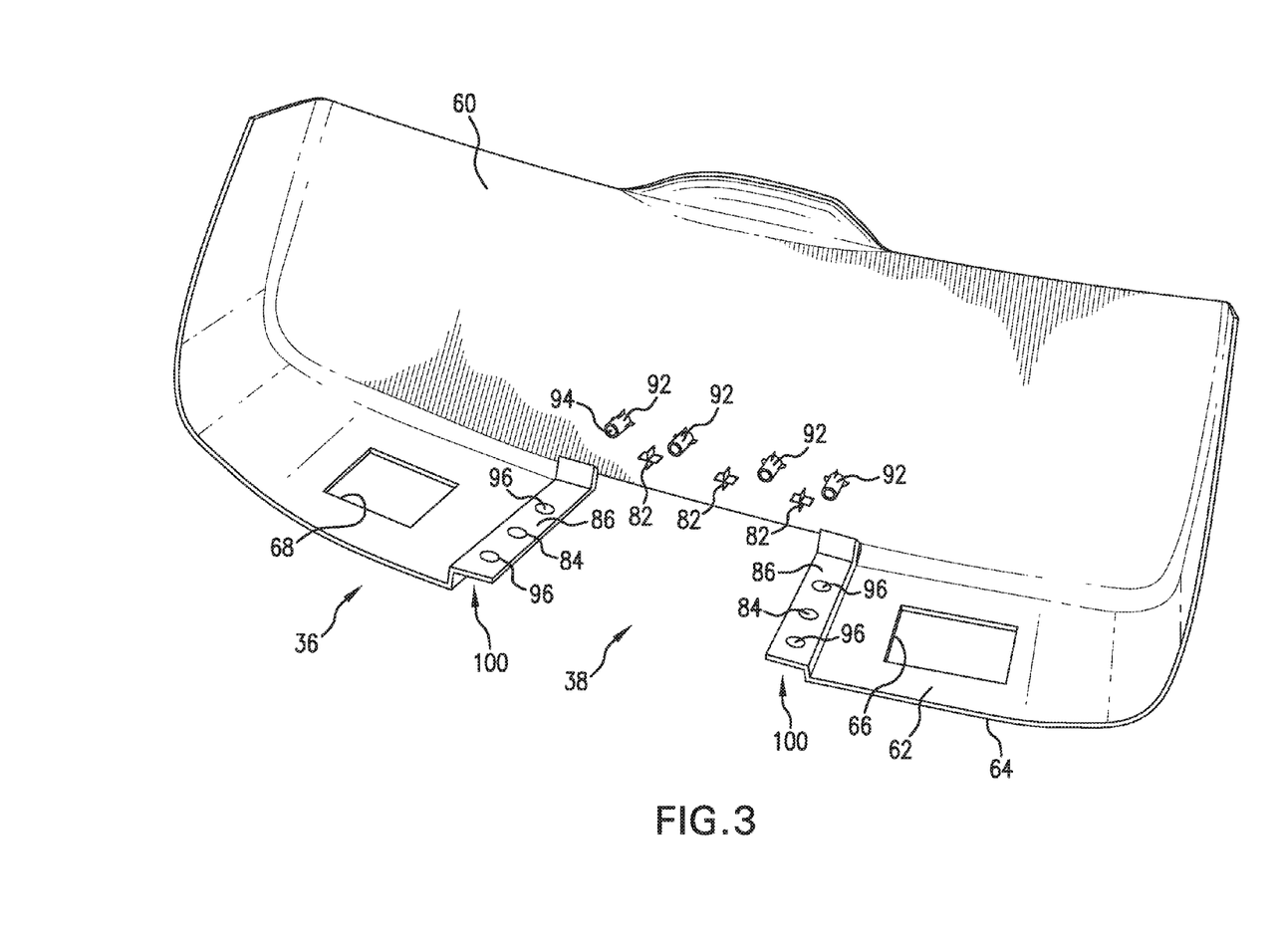
FIG. 3 is an inside perspective view of the tailgate liner shown in isolation.
Figure 4:
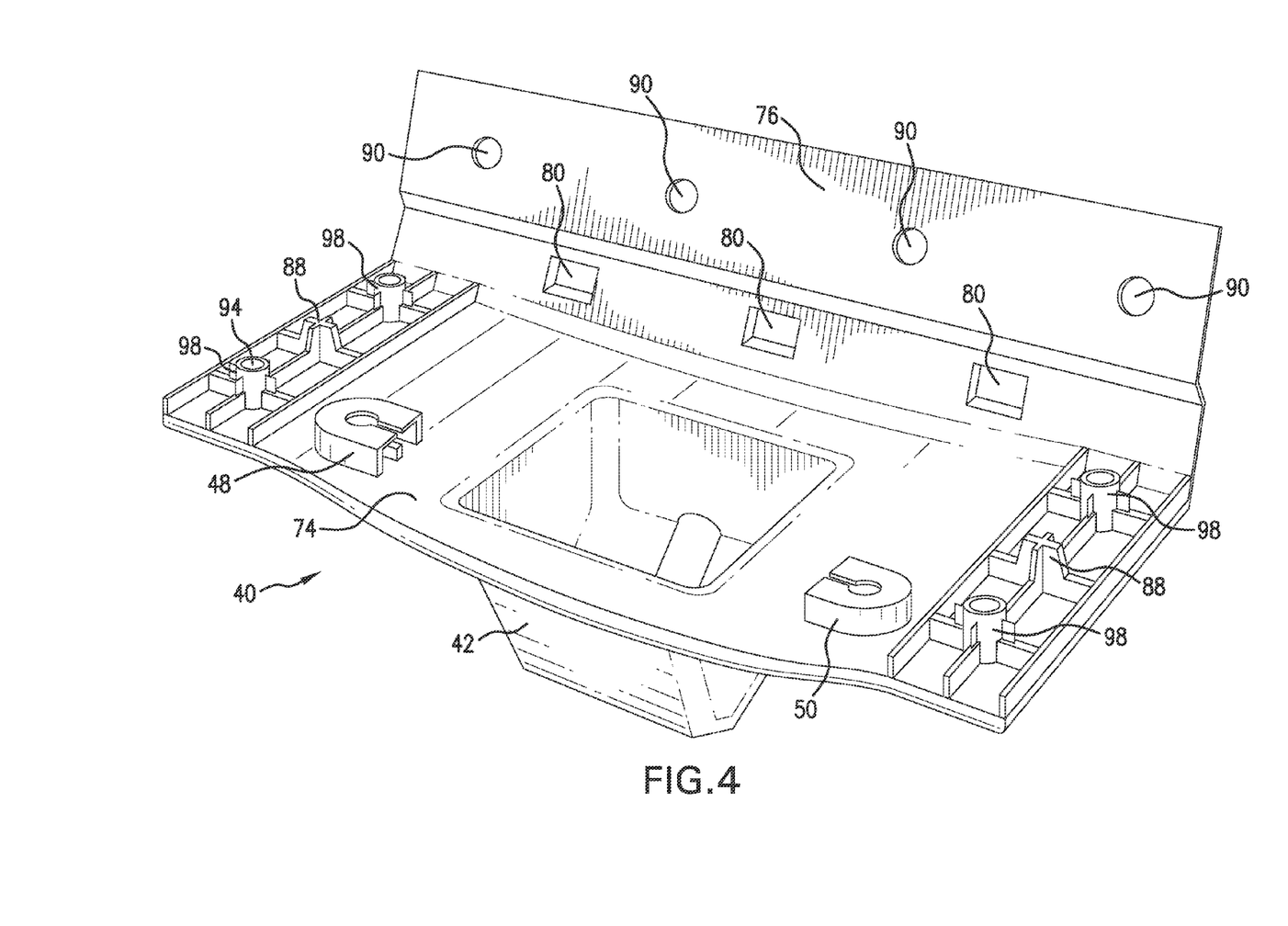
FIG. 4 is an inside perspective view of the tailgate liner insert shown in isolation.

The tailgate liner 36 is shown in isolation in FIG. 3 and likewise the tailgate liner insert 40 is shown in isolation in FIG. 4. In an exemplary embodiment, the tailgate liner 36 is formed of a first material and the tailgate liner insert 40 is formed from a second material that is different than the first material. In a more specific exemplary embodiment, the first material can be an expanded thermoplastic polymer and the second material can be a non-expanded thermoplastic polymer. For example, the first material can be an expanded polypropylene and the second material can be non-expanded polypropylene. The tailgate frame 32 can be conventionally formed and thus can be formed from a metal or alloy (e.g., steel, aluminum, etc.).

The molded feature of the tailgate liner insert 40 can be a single feature or a plurality of features. In the illustrated exemplary embodiment of FIGS. 1-4, the molded feature includes a hollow protruding shell portion 42 integrally molded into the tailgate liner insert 40 for covering a latching protuberance 44 extending from a lower end 46 of the tailgate frame 32 (see FIG. 2B). The latching protuberance 44 and the shell portion 42 together form the latch housing 24 described above in reference to FIG. 1. By covering the latching protuberance 44, the shell portion 42 presents the underside 22 of the tailgate 10 in a more aesthetically pleasing manner (i.e., the appearance of the underside of the tailgate 10 is improved).

In addition or in the alternative, the molded feature can include integrally molded dog house clip structures 48, 50 flanking the shell portion 42. In the illustrated embodiment, the molded feature is a plurality of molded features and thus includes the shell portion 42 and both dog house clip structures 48, 50, though this is not required and any one or combination of these features could be employed. The clip structures 48, 50 can be precisely located so as to align with mounting apertures 52, 54 defined in the tailgate frame 32, and particularly on the lower end 46 of the tailgate frame 32 flanking the latching protuberance 44 for receiving mounting clips (not shown). When the tailgate liner insert 40 is fixedly secured to the tailgate liner 36, alignment of the dog house clip structures 48, 50 with the mounting apertures 52, 54 for receiving the mounting clips can be used for locating the tailgate liner assembly 34 on the tailgate frame 32. Optionally, additional securing devices or methods can be used and applied to secure the tailgate liner 36 to the tailgate frame 32. For example, such additional securing devices or methods could be used after the dog house clip structures 48, 50 are aligned with the mounting apertures 52, 54 and receive mounting clips therein. For example, additional clips could secure the tailgate liner 36 to the tailgate frame 32, adhesive could be used, etc.

As best shown in FIG. 3, the tailgate liner 36 can be generally L-shaped with a main wall portion 60 that overlays the tailgate frame 32 to form an interior wall of the tailgate 10 and an underside wall portion 62 that overlays the lower end 46 of the tailgate frame 32. The insert aperture 38 can be defined fully or primarily in the underside wall portion 62. For example, as shown in the illustrated embodiment, the insert aperture 38 extends from a distal edge 64 of the underside wall portion 62 through an entirety of the underside wall portion 62 to the mounting wall portion 60. Apertures 66 and 68 can be defined in the underside wall portion 62 in flanking positions relative to the insert aperture 38. That is, the aperture 66 can be provided on one side of the insert aperture 38 and the aperture 68 can be provided on the other side of the insert aperture 38. The aperture 66, 68 can, respectively, correspond to the grasping feature 26 and the powered actuator feature 28 provided on the underside 22 of the tailgate 10. For example, the aperture 66 can be sized so as to accommodate a recessed grasping housing 70 that is provided as the grasping feature 26 and the aperture 68 can be appropriately sized to accommodate a switch actuator 72 having the button 28a that provides the powered actuator feature 28.

With specific reference to FIG. 4, the tailgate liner insert 40 can include a frame overlapping wall portion 74 that overlaps the lower end 46 of the tailgate frame 32, and particularly a portion of the lower end 46 of the tailgate frame 32 exposed by the insert aperture 38 defined in the tailgate liner 36. As shown, the integrally molded features, including the shell portion 42 and the dog house clip structures 48, 50 in the illustrated embodiment, are defined in the frame overlapping wall portion 74 of the tailgate liner insert 40. The tailgate liner insert 40 also includes a mounting wall portion 76 that extends from one end of the wall portion 74 and overlaps a portion of the tailgate liner 36 for mounting the tailgate liner insert 40 to the tailgate liner 36. Like the tailgate liner 36, the tailgate liner insert 40 can have an L-shape formed by the wall portions 74, 76.

In the illustrated embodiment, at least one of the tailgate liner 36 and the tailgate liner insert 40 defines apertures and the other of the tailgate liner 36 and the tailgate liner insert 40 includes integrally molded protuberances that are received through these apertures. For example, in the illustrated embodiment, one or more apertures 80 are defined in the mounting wall portion 76 adjacent the frame overlapping wall portion 74 and protuberances in the form of raised rib structures 82 are defined on the main wall portion 60 of the tailgate liner 36. Receipt of the protuberances 82 through the apertures 80 aligns the tailgate liner insert 40 relative to the tailgate liner 36. Similarly, apertures 84 are defined on raised rabbited walls 86 of the tailgate liner 36, particularly at locations defining the insert aperture 38, and protuberances in the form of raised rib structures 88 are defined on the wall portion 74 of the tailgate liner insert 40 and receipt of the protuberances 88 through the apertures 84 align the tailgate liner insert 40 relative to the tailgate liner 36.

Additional apertures 90 can be provided on the wall portion 76 of the tailgate liner insert 40 for receiving protuberances 92 defined on the main wall portion 60 of the tailgate liner 36. In particular, the protuberances 92 can be fastener bosses that define axial apertures 94 for receiving fasteners therein (e.g., heat stake fasteners, bolts, or the like, not shown) to secure the tailgate liner insert 40 to the tailgate liner 36. Likewise, additional apertures 96 can be provided on the raised rabbited walls 86, and flanking the apertures 84 on the raised rabbited walls 86, that receive protuberances 98 defined on the frame overlapping wall portion 74 of the tailgate liner insert 40 which, in the illustrated embodiment, are in the form of fastener bosses that define axial apertures 94 for receiving a fastener therein (again, a heat stake, threaded fastener or the like, not shown) to secure the tailgate liner insert 40 to the tailgate liner 36. The raised rabbited walls 86 define recessed areas 100 for receiving the tailgate liner insert 40 and providing a continuous or flush surface appearance when the tailgate liner insert 40 is secured to the tailgate liner 36.

Figure 5:
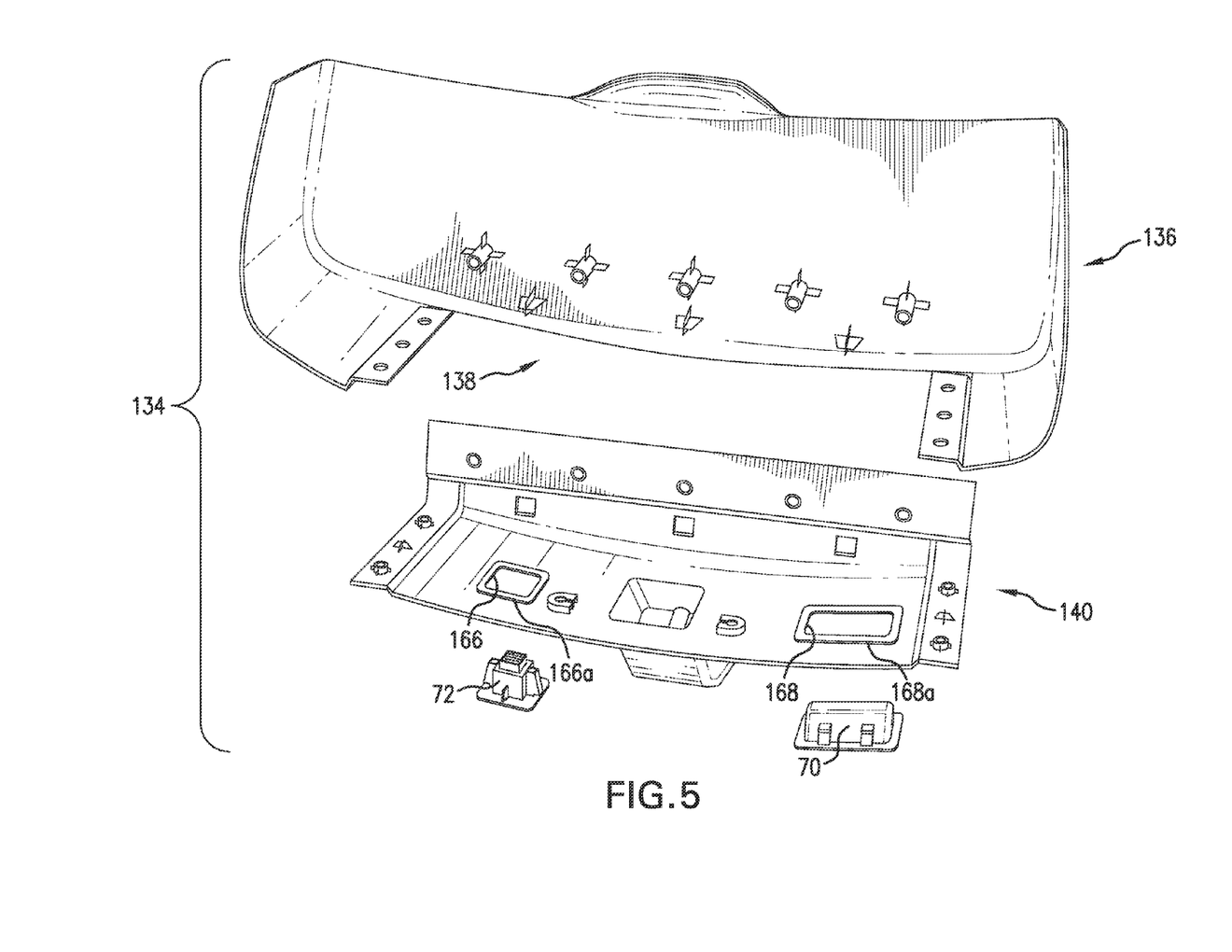
FIG. 5 is an exploded perspective view of a tailgate liner assembly according to an alternate exemplary embodiment.

Referring now to FIG. 5, a tailgate liner assembly 134 is illustrated according to an alternate exemplary embodiment. The tailgate liner assembly 134 can be generally the same or similar as the tailgate liner assembly 34 except as noted hereinbelow. For example, the tailgate liner assembly 134 can include a tailgate liner 136 and a tailgate liner insert 140. The tailgate liner 136 can also include an insert aperture 138 though, as shown, the insert aperture 138 can be wider than the insert aperture 38 of the tailgate liner 36. Likewise, the tailgate liner insert 140 can be wider than the insert 40. In particular, as shown, the tailgate liner insert 140 can include recesses 166, 168 for the grasping feature 26 and the powered actuator feature 28.

Additionally, the integrally molded feature(s) of the tailgate liner insert 140 can include depression shapes 166a, 168a for receiving corresponding tailgate operating parts. For example, the depression shape 166a can accommodate switch actuator 72 to be received through the aperture 166 and recessed into the tailgate liner insert 140 via the depression shape 166a. Likewise, the depression shape 168a can accommodate recessed grasping housing 70 that is received through the aperture 168 and recessed into the tailgate liner insert 140 via the depression shape 168a. Accordingly, in this embodiment, no apertures (e.g., apertures 66 and 68) need be provided in the tailgate liner 140 as the apertures for the grasping feature 26 and the powered actuator feature 28 are provided in the tailgate liner insert 140. In most other respects, the tailgate liner 136 can be like the tailgate liner 36 and the tailgate liner insert 140 can be like the tailgate liner insert 40.

Figure 6:
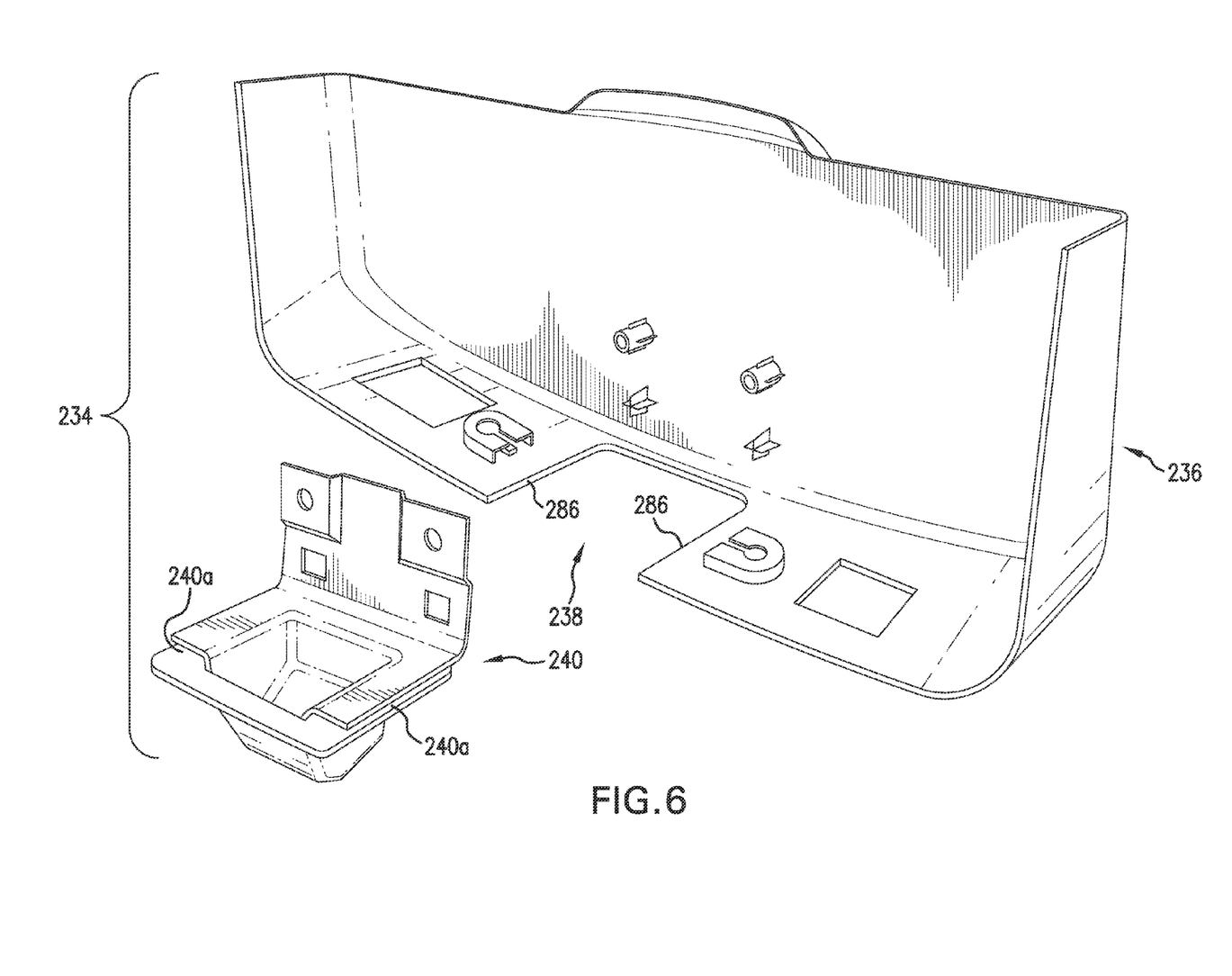
FIG. 6 is an exploded perspective view of a tailgate liner assembly according to another alternate exemplary embodiment.

With reference to FIG. 6, a tailgate liner assembly 234 is shown according to another alternate embodiment. Generally, the tailgate liner assembly 234 can be like the tailgate liner assembly 34 of the first exemplary embodiment except as indicated hereinbelow. For example, the tailgate liner assembly 234 can include the tailgate liner 236 defining an insert aperture 238, and includes a tailgate liner insert 240 accommodated within the insert aperture 238. One difference in the tailgate liner assembly 234 relative to the tailgate liner assembly 34 is that the tailgate liner insert 240 includes grooves 240a defined along lateral ends or sides thereof. The insert aperture 238 of the tailgate liner 236 is defined by lateral side edges 286 that are received within the grooves 240a of the tailgate liner insert 240. As shown, fewer apertures and protuberances can be provided for securing and/or aligning the tailgate liner insert 240 on the tailgate liner 236 due to the engagement and cooperation between the lateral side edges 286 and the grooves 240a of the tailgate liner insert 240. In most other respects, the tailgate liner 236 can be like the tailgate liner 36 and the tailgate liner insert 240 can be like the tailgate liner insert 40.

Figure 7:
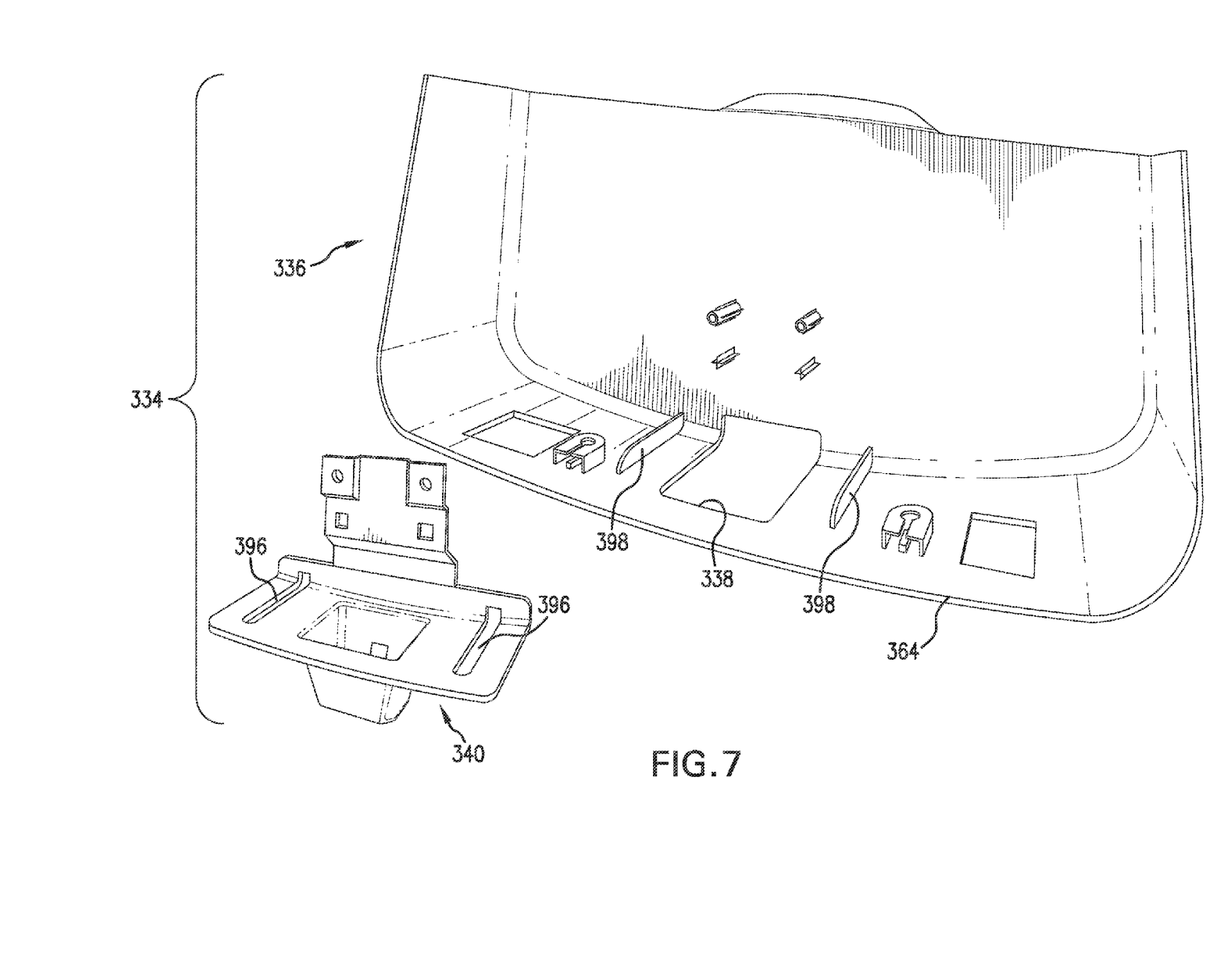
FIG. 7 is an exploded perspective view of a tailgate liner assembly according to yet another alternate exemplary embodiment.

With reference now to FIG. 7, a tailgate liner assembly 334 is shown according to yet another exemplary embodiment. The tailgate liner assembly 334 can be like the tailgate liner assembly 34 except as noted hereinbelow. For example, the tailgate liner assembly 334 can include a tailgate liner 336 having an insert aperture 338 for accommodating a tailgate liner insert 340. In this embodiment, the slots and protuberances for aligning and/or securing the tailgate liner insert 340 to the tailgate liner 336 can include slots or slotted apertures 396 that receive heat stake ribs 398 respectively in the slotted apertures 396. An additional difference is that the insert aperture 338 can be defined as a closed aperture wholly within the tailgate liner 336 spaced apart from distal edge 364. In most other respects, the tailgate liner 336 can be like the tailgate liner 36 and the tailgate liner insert 340 can be like the tailgate liner insert 40.

Figure 8:
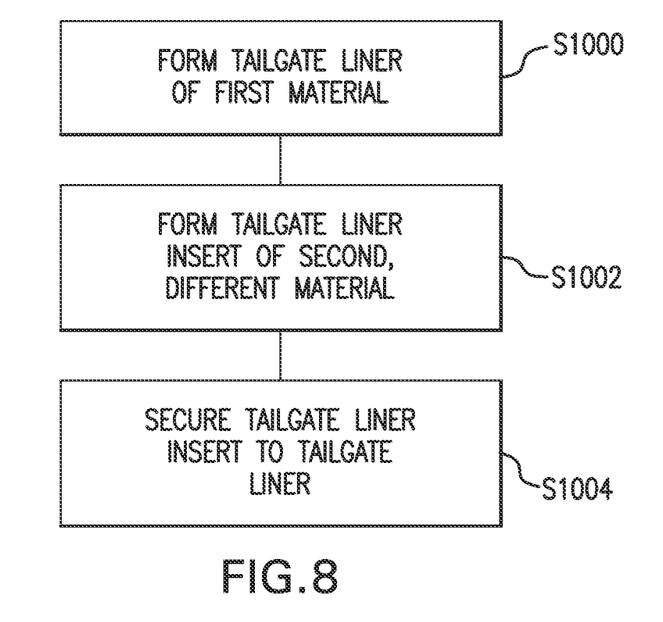
FIG. 8 is a process flow diagram illustrating a method of forming a tailgate for a vehicle according to an exemplary embodiment.

A method of forming a tailgate for a vehicle will now be described. In particular, the method will be described in association with the exemplary embodiments discussed hereinabove, though this is not required and it should be appreciated that the method can be used with other tailgate liner assemblies and tailgates, including variations of the tailgate 10 and tailgate liner assemblies 34, 134, 234, 334 discussed hereinabove. In the method, at S1000, a tailgate liner, such as tailgate liner 36, 136, 236 or 336, is formed of a first material. As discussed, the tailgate liner is adapted to overlay tailgate frame of a tailgate (e.g., frame 32) and the tailgate liner defines an insert aperture along a lower side thereof (e.g., insert aperture 38, 138, 238 or 338). In addition, at S1002, a tailgate liner insert is formed of a second material that is different from the first material. For example, the tailgate liner insert can be formed of non-expanded polypropylene and the tailgate liner can be formed of expanded polypropylene. As already described hereinabove, the tailgate liner insert is adapted to be accommodated within an insert aperture of the tailgate liner and can include an integrally molded feature. In particular, forming the tailgate liner of a first material can include injection molding the tailgate liner of polypropylene and forming the tailgate liner insert of a second material can include injection molding the tailgate liner insert of expanded polypropylene. After forming the tailgate liner in S1000 and the tailgate liner insert in S1002, the tailgate liner insert can then be secured to the tailgate liner at S1004.

One advantage of forming tailgate liner assemblies 34, 134, 234 and 334 of a tailgate liner and a separate tailgate liner insert is that the tailgate liner can be formed of the first material that is different from the second material. In one embodiment, the first material can be expanded polypropylene, which provides various structural characteristics that are advantageous for a large portion of the tailgate liner assembly. For example, the strength to weight ratios are very good for a large portion of the tailgate liner assembly to be formed of expanded polypropylene. However, current molding techniques do not easily allow integrally molded features to be provided in an expanded polypropylene part, particularly when the part is injection molded. Thus, such integrally molded features can be conventionally injection molded into a non-expanded polypropylene part (e.g., the tailgate liner insert) and that part then secured to the expanded polypropylene tailgate liner. This provides for the tailgate liner assembly to be substantially formed of expanded polypropylene or some other beneficial material while allowing the integrally molded features to be formed from a different material that lends itself more easily to forming such features.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A tailgate on a vehicle, comprising:
   a tailgate frame;
   a tailgate liner secured to the tailgate frame; and
   a tailgate liner insert separately formed from the tailgate liner and fixedly secured to the tailgate liner, the tailgate liner insert having an integrally molded feature, wherein the molded feature includes a depression shape for receiving a tailgate operating part extending from a lower end of the tailgate frame, wherein the tailgate liner defines an insert aperture in which the tailgate liner insert is accommodated,
   wherein the tailgate liner insert includes grooves defined along lateral ends thereof, the insert aperture of the tailgate liner defined by lateral side edges that are received in the grooves of the tailgate liner insert.

2. The tailgate of claim 1 wherein the tailgate liner is formed of a first material and the tailgate liner insert is formed of a second material that is different than the first material.

3. The tailgate of claim 2 wherein the first material is an expanded thermoplastic polymer and the second material is a thermoplastic polymer.

4. The tailgate of claim 3 wherein the first material is expanded polypropylene and the second material is non-expanded polypropylene.

5. The tailgate of claim 4 wherein the tailgate frame is formed from a metal or alloy.

6. The tailgate of claim 1 wherein the molded feature includes a hollow protruding shell portion for covering a lock protuberance extending from the lower end of the tailgate frame.

7. The tailgate of claim 6 wherein the molded feature includes integrally molded doghouse clip structures flanking the shell portion.

8. The tailgate of claim 7 wherein the clip structures are precisely located to align with mounting apertures defined in the tailgate frame for receiving mounting clips.

9. The tailgate of claim 1 wherein the tailgate liner insert includes a frame overlapping wall portion that overlaps the lower end of the tailgate frame exposed by a recess defined in the tailgate liner, the integrally molded feature defined in the frame overlapping wall portion.

10. The tailgate of claim 9 wherein the tailgate liner insert includes a mounting wall portion that extends from one end of the frame overlapping wall portion and overlaps a portion of the tailgate liner for mounting the tailgate liner insert to the tailgate liner.

11. The tailgate of claim 10 wherein the tailgate liner is generally L-shaped with a main wall portion that overlays the tailgate frame to form an interior wall of the tailgate and an underside wall portion that overlays the lower end of the tailgate frame.

12. The tailgate of claim 1 wherein at least one of the tailgate liner and the tailgate liner insert defines apertures and the other of the tailgate liner and the tailgate liner insert includes integrally molded protuberances that are received through the apertures.

13. The tailgate of claim 12 wherein receipt of the protuberances through the apertures aligns the tailgate liner insert relative to the tailgate liner.

14. The tailgate of claim 12 wherein the protuberances are fastener bosses that define an axial aperture for receiving a fastener therein to secure the tailgate liner insert to the tailgate liner.

15. The tailgate of claim 12 wherein the apertures are slots and the protuberances are heat stake ribs received respectively in the slots.

16. A tailgate liner assembly for a tailgate on a vehicle, comprising:
   a tailgate liner defining an insert aperture; and
   a tailgate liner insert having an integrally molded feature that is unsuitable for incorporation into the tailgate liner, the tailgate liner insert received in the insert aperture defined by the tailgate liner, the tailgate liner and tailgate liner insert separately formed from different materials, wherein the molded feature includes a depression shape for receiving a tailgate operating part extending from a tailgate frame of the tailgate,
   wherein the tailgate liner insert includes grooves defined along lateral ends thereof, and the insert aperture of the tailgate liner is defined by lateral side edges that are received in the grooves of the tailgate liner insert.

17. A method of forming a tailgate for a vehicle, comprising:
   forming a tailgate liner of a first material, the tailgate liner adapted to overlay a tailgate frame of the tailgate, the tailgate liner defining an insert aperture along a lower side thereof;
   forming a tailgate liner insert of a second material that is different from the first material, the tailgate liner insert adapted to be accommodated within the insert aperture of the tailgate liner and having an integrally molded feature, wherein the molded feature includes a depression shape for receiving a tailgate operating part extending from the tailgate frame,
   wherein the tailgate liner insert includes grooves defined along lateral ends thereof, and the insert aperture of the tailgate liner is defined by lateral side edges that are received in the grooves of the tailgate liner insert; and
   after forming of the tailgate liner and the tailgate liner insert, securing the tailgate liner insert to the tailgate liner.

18. The method of claim 17 wherein forming the tailgate liner of a first material includes injection molding the tailgate liner of polypropylene and forming the tailgate liner insert of a second material includes injection molding the tailgate liner insert of expanded polypropylene.

* * * * *